Dec. 13, 1927.

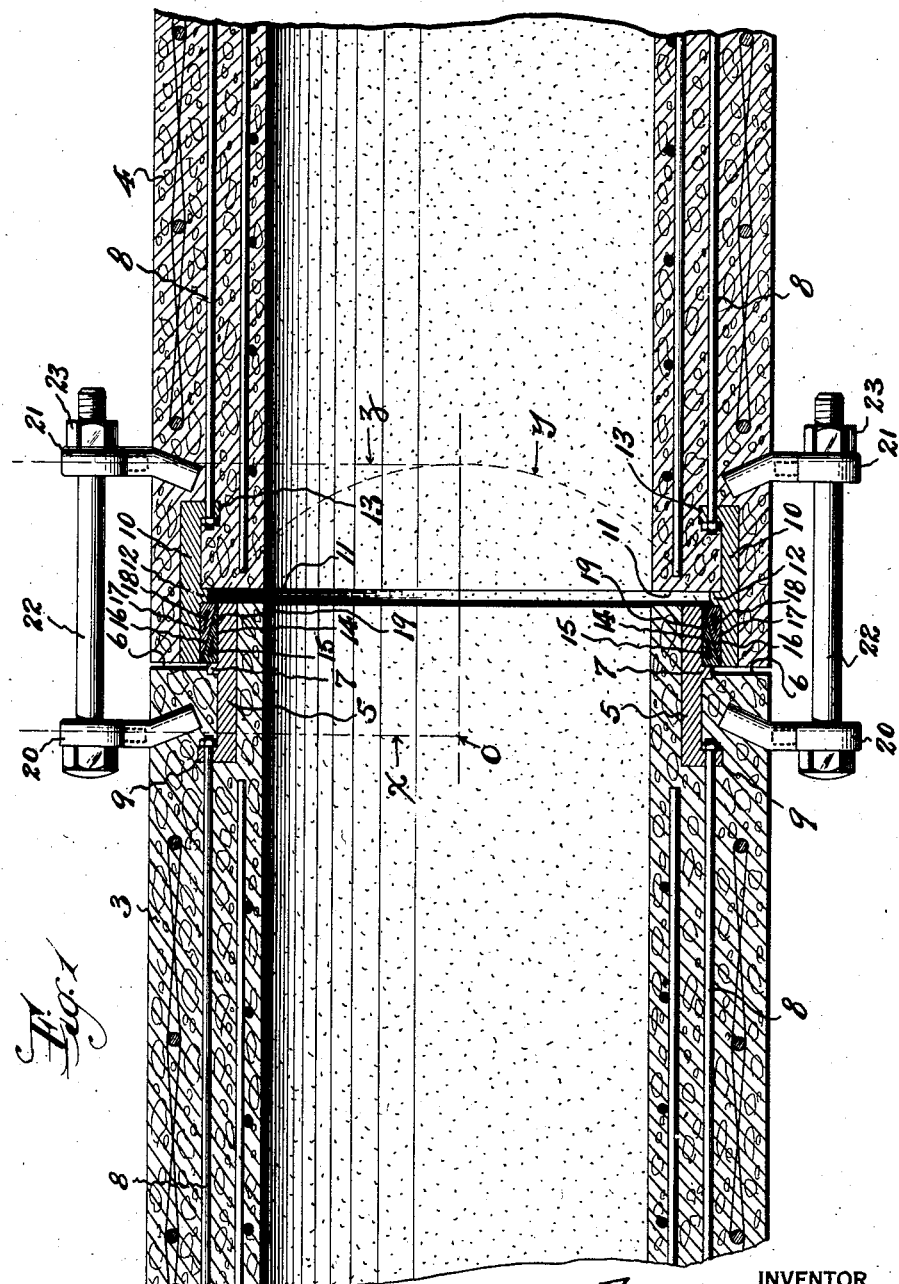

F. H. SHERRERD 1,652,418

SELF CALKING JOINT FOR CONCRETE PIPE

Filed Dec. 14, 1926　　2 Sheets-Sheet 2

INVENTOR
Francis H. Sherrerd,
BY
Frantzel & Richards
ATTORNEYS

Patented Dec. 13, 1927.

1,652,418

UNITED STATES PATENT OFFICE.

FRANCIS H. SHERRERD, OF EAST ORANGE, NEW JERSEY, ASSIGNOR TO NEWARK CONCRETE PIPE CO., OF NEWARK, NEW JERSEY, A CORPORATION OF NEW JERSEY.

SELF-CALKING JOINT FOR CONCRETE PIPE.

Application filed December 14, 1926. Serial No. 154,775.

This invention relates to improvements in joint structure for concrete and similar pipe; and the invention has reference, more particularly, to an improved construction of self-calking joint for such pipe.

The invention has for its principal object to provide, in connection with cooperating bell and spigots ends of adjoining concrete pipe sections, a novel joint structure which is self-sealing or self-calking when such adjoining sections are secured together, whereby the connection is rendered efficiently fluid-tight under conditions of use, and whereby the connection is especially suitable for subaqueous work.

The invention has for a further object to provide a novel construction of self-calking fluid-tight joint, which will permit of some displacement of adjoining pipe sections from normal true alignment or grade, without danger of opening up the joint or impairing its pressure resisting efficiency.

Other objects of this invention, not at this time more particularly enumerated, will be clearly understood from the following detailed description of the same.

The invention is illustrated in the accompanying drawings, in which:—

Figure 1 is a longitudinal section of adjoined bell and spigot ends of pipe sections, illustrating one embodiment of the novel self-calking joint structure made according to this invention.

Figure 2 is a similar longitudinal section, showing another form of the novel self-calking joint which also embodies the principles of this invention.

Figure 6:
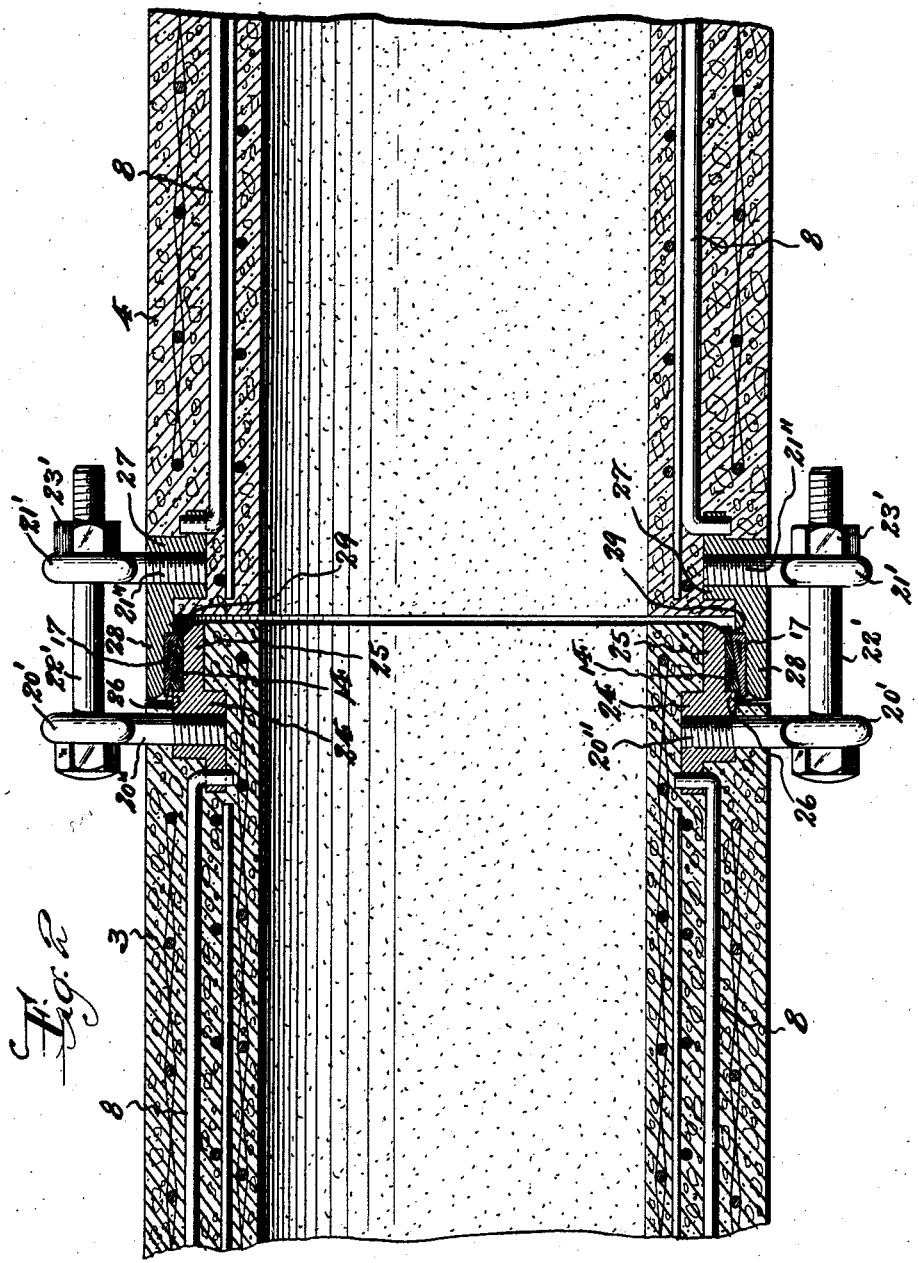

In the drawings, the reference characters 3 and 4 respectively indicate adjoining pipe or conduit sections. Imbedded in the material composing the pipe or conduit section 3 is a metallic spigot-ring 5, which is preferably made of cast-iron. The spigot-ring 5 is of substantially less diameter than the outside diameter of the pipe or conduit section 3, and its outer end portion extends longitudinally beyond the external shoulder 6 of the latter. Said spigot-ring is formed to provide an external annular abutment or stop-flange 7, which is rearwardly spaced from the outer free end thereof, and which is preferably positioned adjacent to the juncture of said external shoulder 6 of the pipe or conduit section with said spigot-ring. When the pipe or conduit section 3 is composed of reenforced concrete, the longitudinal metallic reenforcing rods 8 thereof are suitably secured or anchored to the inner imbedded end 9 of said spigot-ring.

Imbedded in the material composing the pipe or conduit section 4 is a metallic bell-ring 10, which is also preferably made of cast-iron. This bell-ring is of substantially greater diameter than the inside diameter of said pipe or conduit section 4, and its outer end portion extends longitudinally beyond the internal shoulder 11 of the latter. Said bell-ring 10 is formed to provide an internal annular abutment or stop-flange 12, which is rearwardly spaced from the outer free end thereof, and which is preferably positioned adjacent to the juncture of said internal shoulder 11 of the pipe or conduit section 4 with said bell-ring. When the pipe or conduit section 4 is composed of reenforced concrete, the adjacent ends of the longitudinal metallic reenforcing rods 8, the opposite ends of which are anchored to the spigot-ring at the opposite end of such pipe or conduit section 4, are in like manner suitably secured or anchored to the inner imbedded end 13 of said bell-ring 10.

The diameter of the bell-ring 10 at one end of a pipe or conduit section is in excess of the diameter of the spigot-ring 5 at the cooperating end of an adjoining pipe or conduit, so that the latter will loosely enter or telescope into the former when said pipe or conduit sections are joined together.

Supported on the exposed outer surface of said spigot-ring 5, so as to abut against the stop-flange 7 thereof, is an externally beveled soft metal gasket 14. This gasket 14 is preferably made of lead in hollow form, within which is disposed a core 15 of fibrous material. The external beveled surface 16 of said gasket tapers from the inner butt end thereof toward the outer free end of said spigot-ring 5.

Supported on the exposed inner surface of said bell-ring 10, so as to abut against the stop-flange 12 thereof, is an internally beveled soft metal gasket 17, which is also preferably made of lead in hollow form, and within which is disposed a core 18 of fibrous material. The internal beveled surface 19 of said gasket 17 tapers from the inner butt end thereof toward the outer free end of said bell-ring 10.

Connected with the spigot end of the pipe or conduit section 3 are a pair of diametrically opposite laterally and outwardly projecting eye-members 20, the inner ends of which are suitably imbedded and anchored in the body of said pipe or conduit section 3. Connected, in like manner, with the bell end of the adjoining pipe or conduit section 4 are a pair of diametrically opposite laterally and outwardly projecting eye-members 21, the inner ends of which are suitably imbedded or anchored in the body of said pipe or conduit section, so that, when said pipe or conduit sections are joined together the said eye-members 21 of one section will be longitudinally opposed to the eye-members 20 of the adjoining section, and so that tie-bolts 22, with fastening nuts 23, may be operatively engaged between the thus longitudinally opposed pairs of eye-members 20 and 21.

When, in laying the pipe or conduit, the cooperating spigot and bell ends of adjoining sections are brought together, the oppositely beveled faces of the respective gaskets 14 and 17 thereof are caused to meet, so that when the tie-bolts 22 are passed through the longitudinally opposed eye-members 20 and 21, and the fastening nuts 23 applied and screwed home, the said cooperating spigot and bell ends will be drawn together, and, since the gaskets 14 and 17 are backed by the respective stop-flanges 7 and 12, the same will be forced one toward the other. As the gaskets 14 and 17 thus move together, owing to their oppositely directed wedge-like conformation and their comparatively soft character, they will be very tightly compacted, both against the respective spigot and bell rings by which they are supported, as well as in relation one to the other. As a consequence of the above described functioning, the cooperating gaskets 14 and 17 operate to very tightly seal the joint between the cooperating spigot and bell ends of adjoining pipe or conduit sections, and render said ends self-calking. By this arrangement an exceedingly efficient fluid-tight joint is produced in a very simple and easy manner, and without necessity for employing especially skilled labor.

It is a known fact that in laid pipe or conduit, especially under subaqueous conditions of use, relative displacements of adjoining sections from true axial alignment frequently occur, and that such displacements frequently entail weakening or opening up of joints whereby leakage results. In connection with my novel self-calking joint structure I have provided an arrangement adapted to permit of some relative displacement of the adjoining pipe or conduit sections without risk of disturbing or impairing the fluid-tight condition of the joint. In this connection it will be noticed that the externally beveled spigot gasket 14 provides the ball element while the internally beveled bell gasket 17 provides the socket element of a joint structure similar in effect and operation to a so-called ball and socket joint, so that movement of the one relative to the other will be permitted, the soft character of the said gaskets permitting the same to accommodate themselves one to the other, under such circumstances, without separation of their meeting faces. In order to permit of such relative movement of the adjoining pipe or conduit sections in one plane, the eye-members 20 are disposed so as to be transversely aligned on a line $x$ intersecting the center $o$ of an arc $y$ substantially passing between the meeting faces of the cooperating gaskets 14 and 17 (as shown in Figure 1), while the eye-members 21 are disposed so as to be transversely aligned on a line $z$ tangent to the arc $y$ (as is also shown in Figure 1). It is preferable that the eye-portions of said eye-members 20 and 21 possess a swiveling connection with the anchor end-portions thereof. Owing to the above described arrangement and location of the eye-members 20 and 21, it will be clearly apparent that adjoining pipe or conduit sections are rendered capable of relative divergence from true axial alignment in a plane at right angles to the plane of the eye-members 20 and 21.

Referring now to Figure 2 of the drawings, there is illustrated therein a slightly modified construction and arrangement of my novel self-calking joint. In this form of joint I provide in the spigot ends of the pipe or conduit sections a metallic spigot-ring 24 provided with an outward extension 25 of reduced diameter forming a stop-shoulder 26. The externally beveled gasket 14 is mounted on the extension 25 with its rearward end abutting said stop-shoulder 26. Laterally and outwardly projecting eye-members 20' are provided with threaded shanks 20'' to screw into the body of said spigot-ring 24, so that the same are directly secured and anchored in connection therewith. In a similar manner, the bell ends of the pipe or conduit sections are provided with a metallic bell-ring 27 having an outward extension 28 at the rear end of which is formed a stop-shoulder 29. The internally beveled gasket 17 is mounted on the inner side of said extension 28 with its rear end abutting said stop-shoulder 29. Laterally and outwardly projecting eye-members 21' are provided with threaded shanks 21'' to screw into the body of said bell-ring 27, so that the same are directly secured and anchored in connection with the latter. The reenforcing rods 8 of the pipe or conduit sections thus equipped may be suitably secured by their ends to the inner ends of said spigot and bell rings respectively. Tie-bolts 22' and fastening nuts 23' are provided to cooperate with the longitudinally opposed eye-members 20' and 21', when cooperating spigot and bell portions of adjoining pipe or conduit sections are operatively assembled together. The advantages of and manner in which the above described modified form of self-calking joint functions is substantially the same as described in connection with the first mentioned construction, except that the pull of the tightened tie-bolts 22' is transmitted through the eye-members 20' and 21' directly to the cooperating spigot and bell rings 24 and 27.

In some classes of work the eye-members and connecting tie-bolts may be omitted, in which case the bell and spigot rings of adjoining pipe or conduit sections may be forced together when laying the pipe by any suitable method.

Having thus described my invention, I claim:—

1. A self-calking joint for adjoining ends of concrete pipe sections, comprising a metallic spigot-ring imbedded in an end of one pipe section, said spigot-ring having an external stop-shoulder spaced inwardly from its outer free end, a metallic bell-ring imbedded in an end of an adjoining pipe section, said bell-ring having an internal stop-shoulder spaced inwardly from its outer free end, said bell-ring being adapted to loosely receive said spigot-ring when the adjoining ends of said pipe sections are brought together, oppositely beveled soft-metal gaskets interposed in meeting relation between said spigot and bell-rings, one gasket being backed by said stop-shoulder of said spigot-ring and the other gasket being backed by said stop-shoulder of said bell-ring whereby the same are wedged together in calking relation to and between said rings when the latter are drawn together.

2. A self-calking joint for adjoining ends of concrete pipe sections, comprising a metallic spigot-ring imbedded in an end of one pipe section, said spigot-ring having an external stop-shoulder spaced inwardly from its outer free end, a metallic bell-ring imbedded in an end of an adjoining pipe section, said bell-ring having an internal stop-shoulder spaced inwardly from its outer free end, said bell-ring being adapted to loosely receive said spigot-ring when the adjoining ends of said pipe sections are brought together, oppositely beveled soft-metal gaskets interposed in meeting relation between said spigot and bell-rings, one gasket being backed by said stop-shoulder of said spigot-ring and the other gasket being backed by said stop-shoulder of said bell-ring whereby the same are wedged together in calking relation to and between said rings when the latter are drawn together, and means to both draw and hold together said adjoining pipe sections and their respective spigot and bell-rings.

3. A self-calking joint for adjoining ends of concrete pipe sections, comprising a metallic spigot-ring imbedded in an end of one pipe section, said spigot-ring having an external stop-shoulder spaced inwardly from its outer free end, a metallic bell-ring imbedded in an end of an adjoining pipe section, said bell-ring having an internal stop-shoulder spaced inwardly from its outer free end, said bell-ring being adapted to loosely receive said spigot-ring when the adjoining ends of said pipe sections are brought together, oppositely beveled soft-metal gaskets interposed in meeting relation between said spigot and bell-rings, one gasket being backed by said stop-shoulder of said spigot-ring and the other gasket being backed by said stop-shoulder of said bell-ring whereby the same are wedged together in calking relation to and between said rings when the latter are drawn together, laterally and exteriorly projecting diametrically opposite eye-members secured in connection with each pipe section, and tie-bolts connected between longitudinally aligned eye-members of adjoining pipe sections.

4. In a self-calking joint as defined by claim 3, in which the eye-members of one pipe section are aligned on a line intersecting the center of an arc passing substantially between the cooperating meeting faces of the gaskets of the joint, while the eye-members of the adjoining pipe section are aligned on a parallel line tangent to said arc.

5. A self-calking joint for adjoining ends of concrete pipe sections, comprising a metallic spigot-ring imbedded in an end of one pipe section, said spigot-ring having an external stop-shoulder spaced inwardly from its outer free end, a metallic bell-ring imbedded in an end of an adjoining pipe section, said bell-ring having an internal stop-shoulder spaced inwardly from its outer free end, said bell-ring being adapted to loosely receive said spigot-ring when the adjoining ends of said pipe sections are brought together, an externally beveled annular hollow gasket of soft metal provided with a fibrous core mounted on the exterior side of said spigot-ring so as to be backed by its stop-shoulder, an internally and oppositely beveled annular hollow gasket of soft metal provided with a fibrous core mounted on the interior side of said bell-ring so as to be backed by its stop-shoulder, and means for drawing said adjoining pipe sections together to compel said gaskets to wedge together and between said spigot and bell-rings.

6. A self-calking joint for adjoining ends of concrete pipe sections, comprising a metallic spigot-ring imbedded in an end of one pipe section, said spigot-ring having an external stop-shoulder spaced inwardly from its outer free end, a metallic bell-ring imbedded in an end of an adjoining pipe section, said bell-ring having an internal stop-shoulder spaced inwardly from its outer free end, said bell-ring being adapted to loosely receive said spigot-ring when the adjoining ends of said pipe sections are brought together, an externally beveled annular hollow gasket of soft metal provided with a fibrous core mounted on the exterior side of said spigot-ring so as to be backed by its stop-shoulder, an internally and oppositely beveled annular hollow gasket of soft metal provided with a fibrous core mounted on the interior side of said bell-ring so as to be backed by its stop-shoulder, means for drawing said adjoining pipe sections together to compel said gaskets to wedge together and between said spigot and bell rings, comprising laterally and exteriorly diametrically opposite eye-members having shanks threaded into the bodies of said spigot and bell-rings, and tie-bolts connected between longitudinally aligned eye-members of the adjoined pipe sections.

7. In a self-calking joint as defined by claim 6, in which the eye-members of one pipe section are aligned on a line intersecting the center of an arc passing substantially between the cooperating meeting faces of the gaskets of the joint, while the eye-members of the adjoining pipe section are aligned on a parallel line tangent to said arc.

In testimony, that I claim the invention set forth above I have hereunto set my hand this 26th day of November, 1926.

FRANCIS H. SHERRERD